(12) United States Patent
Yamada

(10) Patent No.: US 7,335,435 B2
(45) Date of Patent: Feb. 26, 2008

(54) WATER STORAGE DEVICE FOR FUEL CELL SYSTEM AND FUEL CELL SYSTEM EQUIPPED WITH THE SAME

(75) Inventor: Kazuhiro Yamada, Miura (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 486 days.

(21) Appl. No.: 10/834,130

(22) Filed: Apr. 29, 2004

(65) Prior Publication Data

US 2004/0241523 A1 Dec. 2, 2004

(30) Foreign Application Priority Data

Jun. 2, 2003 (JP) ............................. 2003-156614

(51) Int. Cl.
*H01M 2/00* (2006.01)
*H01M 2/08* (2006.01)
*H01M 8/04* (2006.01)

(52) U.S. Cl. ............................. 429/34; 429/26; 429/35

(58) Field of Classification Search .................... None
See application file for complete search history.

(56) References Cited

U.S. PATENT DOCUMENTS 5,186,354 A 2/1993 Coffey et al.

| | | | |
|---|---|---|---|
| 5,398,848 A | 3/1995 | Padamsee | |
| 5,969,288 A * | 10/1999 | Baud | 102/466 |
| 5,985,451 A * | 11/1999 | Senda et al. | 428/408 |
| 6,314,663 B1 * | 11/2001 | Saldana | 36/28 |
| 6,428,916 B1 * | 8/2002 | Grasso et al. | 429/13 |
| 2002/0170610 A1 | 11/2002 | Webber | |
| 2004/0129325 A1 | 7/2004 | Bleeck et al. | |

FOREIGN PATENT DOCUMENTS

| | | | |
|---|---|---|---|
| DE | 37 16 250 A1 | 12/1987 | |
| DE | 200 10 873 U1 | 8/2000 | |
| EP | 1 413 809 A1 | 4/2004 | |
| FR | 2 700 320 A1 | 7/1994 | |
| JP | 01-230943 * | 9/1989 | 261/72.1 |
| JP | 5-69742 A | 3/1993 | |
| JP | 7-94202 A | 4/1995 | |
| JP | 2000-149970 A | 5/2000 | |

OTHER PUBLICATIONS

IPDL JPO Machine Translation of JP 2000-149970 (Publication Date May 2000).*

* cited by examiner

*Primary Examiner*—Patrick Joseph Ryan
*Assistant Examiner*—Karie O'Neill
(74) *Attorney, Agent, or Firm*—Foley & Lardner LLP

(57) ABSTRACT

A water storage device for a fuel cell system, which includes: a water storage section; and a volume expansion absorber which contracts to absorb volume expansion of water in the water storage section.

12 Claims, 5 Drawing Sheets

WATER STORAGE DEVICE FOR FUEL CELL SYSTEM AND FUEL CELL SYSTEM EQUIPPED WITH THE SAME

BACKGROUND OF THE INVENTION

1. Field of Invention

The present invention relates to a water storage device for storing water used in a humidification system or the like and a fuel cell system including the water storage device. Particularly, the present invention relates to a technology for preventing damage attributable to volume expansion when water in the water storage device is frozen.

2. Description of Related Art

As countermeasures against global environmental problems, such as air pollution caused by automobile emissions and global warming caused by carbon dioxide, a fuel cell with clean emissions and high energy efficiency has been brought to attention. The fuel cell is an electrochemical device which converts the chemical energy of an electrochemical reaction between air and fuel gas, such as hydrogen gas or hydrogen-rich reformed gas, supplied to an electrolyte/electrode catalyst complex, directly into an electric energy. Among various types of the fuel cells, a solid polymer electrolyte fuel cell with a solid polymer electrolyte membrane is simply constructed, compact and low-cost, and has a high power density. Thus, the solid polymer electrolyte fuel cell is expected to be used as a power source for a movable body such as an automobile.

In the solid polymer electrolyte fuel cell, the solid polymer membrane has two functions, more specifically, a function as an ion conductive electrolyte and a function of separating air and fuel gas from each other within the cell. In order to realize the both functions, the solid polymer membrane is required to be water-saturated. Unless a water content of the solid polymer membrane is sufficient, an ionic resistance thereof is increased and air and fuel gas are mixed, affecting performance of power generation thereof.

A solid polymer membrane of a solid polymer electrolyte fuel cell in practical use tends to be dried at a hydrogen electrode side since protons produced at the hydrogen electrode are transported through the solid polymer membrane together with water molecules. Moreover, if the fuel gas or the air supplied to the fuel cell contains insufficient water vapor, the vicinity of the supply ports tends to be dried.

Therefore, in the solid polymer electrolyte fuel cell, it is required to humidify/moisten the solid polymer membrane, taking moisture from outside into the fuel cell. Usually, there is provided a humidification system in a fuel cell system for humidifying/moistening an electrolyte membrane and/or supplied fuel gas and air.

For a smooth start-up of the fuel cell system applied for an electric vehicle to be used in a cold region or the like, it is necessary to take measures against freezing of water in the humidification system. Japanese Patent Application publication Laid-Open No. 2000-149970 discloses a power generation system for an electric vehicle, in which coolant is used to heat up a water tank and melt frozen water therein at start-up of the system.

SUMMARY OF THE INVENTION

However, in the foregoing power generation system, the water storage tank may be damaged when the water in the water tank is frozen and expands the volume thereof.

The present invention was made in the light of this problem. An object of the present invention is to provide a water storage device for a fuel cell system, which reduces force acting thereon generated by the volume expansion of freezing water, thus preventing damages of the device, such as deformation and cracks.

An aspect of the present invention is a water storage device for a fuel cell system, comprising: a water storage section; and a volume expansion absorber which contracts to absorb volume expansion of water in the water storage section.

BRIEF DESCRIPTION OF THE DRAWINGS

The invention will now be described with reference to the accompanying drawings wherein.

DETAILED DESCRIPTION OF THE PREFERRED EMBODIMENTS

Figure 1:
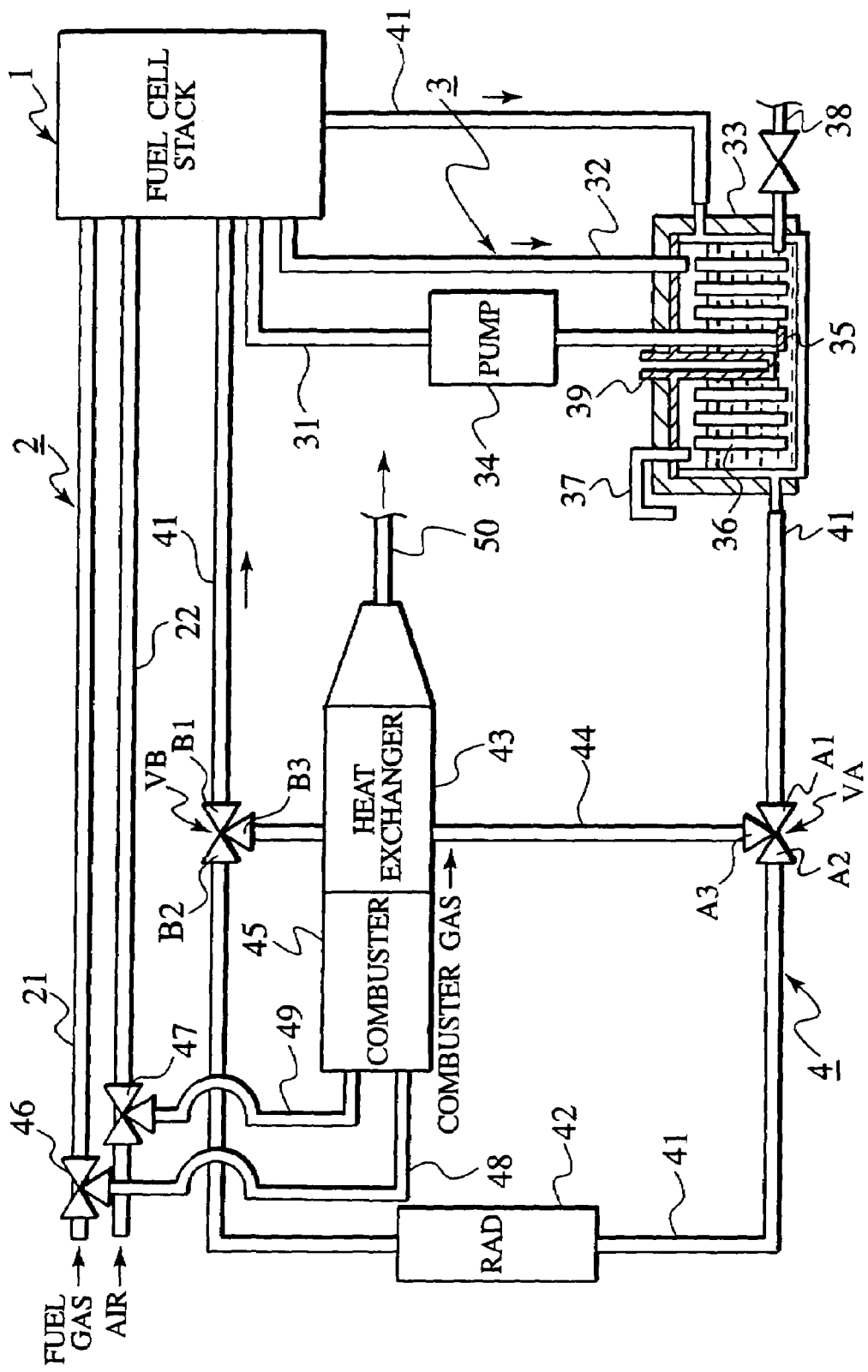
FIG. 1 is a block diagram of a power generation system for an electric vehicle including a water storage tank according to an embodiment of the present invention.

Embodiments of the present invention will be explained below with reference to the drawings, wherein like members are designated by like reference characters.

(First Embodiment)

In this embodiment, a water storage tank of the present invention is applied to a power generation system for an electric vehicle in which a fuel cell is used as a power source of the electric vehicle.

FIG. 1 shows the entire power generation system for an electric vehicle. Generally, this power generation system for an electric vehicle includes: a fuel cell stack 1 that is the power source of the electric vehicle; a fuel and air supply system 2 which supplies fuel gas (hydrogen gas or hydrogen-rich gas) and oxidant gas (air) to the fuel cell stack 1; a humidification system 3 which supplies water for humidification to the fuel cell stack 1; and a cooling system 4 for cooling the fuel cell stack 1.

The fuel cell stack 1 has a structure in which power generation cells are stacked in multiple stages. Specifically, in each of the power generation cells, a fuel electrode to which the fuel gas is supplied and an air electrode to which oxygen (air) is supplied are superposed with each other while sandwiching an electrolyte/electrode catalyst complex therebetween. The fuel cell stack 1 converts a chemical energy into an electric energy by an electrochemical reaction. At the fuel electrode of each cell, hydrogen in the supplied fuel gas frees electrons to form two protons. While the electron moves toward the air electrode through an external circuit, the proton diffuses into the electrolyte membrane, and at the air electrode, reacted with the electron and oxygen in the supplied air to form water, which is discharged to the outside.

As the electrolyte of the fuel cell stack 1, for example, a solid polymer electrolyte is used to achieve weight saving and high energy density at low cost. The solid polymer electrolyte consists of, for example, an ion (proton) conductive polymer membrane such as a fluoropolymer ion-exchange membrane. As described above, the solid polymer electrolyte functions as an ion conductive electrolyte by saturation with water. Thus, in this fuel cell stack 1, it is required to humidify/moisten the solid polymer electrolyte by supplying water thereto.

The fuel and air supply system 2 is provided to supply hydrogen as the fuel and air as the oxidant to the respective fuel electrode and air electrode of the fuel cell stack 1. This system 2 includes: a fuel supply path 21 for supplying hydrogen gas or hydrogen-rich gas; and an air supply path 22 for supplying air. The fuel supply path 21 is connected to a fuel supply port of the fuel cell stack 1 and the air supply path 22 is connected to an air supply port of the fuel cell stack 1.

In the fuel supply path 21, hydrogen is supplied from an hydrogen tank (not shown), being regulated to a predetermined pressure by a pressure reducing valve and adjusted to a desired pressure corresponding to operating conditions by a pressure control valve which is controlled by, for example, a control unit such as a microcomputer, and is supplied to the fuel cell stack 1. Moreover, in the air supply path 22, air introduced by a compressor or the like (not shown) is adjusted to a desired pressure corresponding to operating conditions by a pressure control valve and is supplied to the fuel cell stack 1.

Meanwhile, the humidification system 3 humidifies at least one of the solid polymer electrolyte membrane of the fuel cell stack 1, fuel gas or air. The humidification system 3 consists of: a humidification water supply path 31 for supplying water for humidification; a water recovery path 32 for recovering excess water; a water storage tank 33 that is a water storage device for storing the water for humidification; and a water pump 34 for pumping up the water in the water storage tank 33. The water in the water storage tank 33 is pumped up by the water pump 34 and supplied through the humidification water supply path 31 to humidify the fuel cell stack 1, then excess water is returned to the water storage tank 33 through the water recovery path 32. The humidification water may be supplied to the fuel cell stack 1 by humidifying gas (hydrogen and air) using a humidifier, instead of supplying water directly to the fuel cell stack 1.

At an inlet of the humidification water supply path 31, a strainer 35 is attached to prevent foreign matter from flowing thereinto. Moreover, the water storage tank 33 is provided with a water storage section 33a that is a space for storing water, heat transfer tubes 36 as a heater for heating inside of the water storage section 33a, an air breather 37 for suppressing a pressure increase in the water storage section 33a, a drain port 38 for discharging water in the water storage section 33a, and a volume expansion absorber 39 for absorbing volume expansion of the water in the water storage section 33a when the water is frozen. Additionally, the water storage tank 33 is provided with a thermometer (not shown) for measuring a temperature of the water in the water storage section 33a, a water level indicator (not shown) for measuring an amount of the water and the like.

Moreover, an optimum operating temperature of the solid polymer electrolyte fuel cell stack 1 is as relatively low as about 80° C. Then, it is required to cool the fuel cell stack 1 when it is over heated. Accordingly, in this power generation system for an electric vehicle, the cooling system 4 for cooling the fuel cell stack 1 is provided. This cooling system 4 includes a circulating path 41 through the fuel cell stack 1, through which a coolant flows. The cooling system 4 cools the fuel cell stack 1 by use of, for example, an antifreeze liquid (a liquid having a lower freezing point than pure water) as the coolant and maintains the fuel cell stack 1 at an optimal temperature. Note that, as the coolant, any other media than the antifreeze liquid described above may be used. For an application in a cold region or the like, it is preferable that the antifreeze liquid being used has a low freezing point.

In the circulating path 41 of the cooling system 4, a radiator 42 is provided, which cools the coolant heated by cooling the fuel cell stack 1. Moreover, a branch path 44 communicated with a heat exchanger 43 is provided in parallel with the radiator 42. For example, in the case where the fuel cell stack 1 is required to be heated to a predetermined temperature suitable for a start-up in the cold region or the like, the antifreeze liquid is introduced, by operating path switching valves VA and VB, to the heat exchanger 43, in which the antifreeze liquid is heated. In this case, the antifreeze liquid functions as a warming medium. Moreover, the circulating path 41 is also connected to a heater in the water storage section, which is provided in the water storage tank 33 of the humidification system 3. Thus, at the start-up in the cold region or the like, the heater in the water storage section uses the heated antifreeze liquid as the warming medium to melt the ice in the water storage tank 33.

The heat exchanger 43 takes its heat generated by combustion in a hydrogen combustor 45, to which hydrogen gas (hydrogen-rich gas) and air of the fuel and air supply system 2 are supplied and the hydrogen gas is burned therein. Specifically, in the middle of the fuel supply path 21 and the air supply path 22 of the fuel and air supply system 2, valves 46 and 47 are provided, respectively. A branch fuel supply path 48 and a branch air supply path 49, which are branched off from the respective valves 46 and 47, are connected to the hydrogen combustor 45. The combustion gas is exhausted from the hydrogen combustor 45 to the outside through an exhaust pipe 50 after the generated heat is absorbed by the heat exchanger 43.

In the power generation system as described above, during the normal running period, the path switching valve VA of the cooling system 4 is controlled to have port Al and port A2 thereof communicated with each other and the path switching valve VB is controlled to have port B1 and port B2 thereof communicated with each other. Thus, a circuit in which the antifreeze liquid is circulated between the fuel cell stack 1 and the radiator 42 is formed. In this case, the antifreeze liquid functions as a coolant and heat removed from the fuel cell stack 1 is radiated at the radiator 42, thus controlling the temperature of the fuel cell stack 1.

Meanwhile, at the time of cold start-up in a cold region or the like, the path switching valve VA is controlled to have port Al and port A3 thereof communicated with each other and the path switching valve VB is controlled to have port B1 and port B3 thereof communicated with each other. Thus, a circuit in which the antifreeze liquid is circulated between the fuel cell stack land the heat exchanger 43 is formed. In this event, hydrogen gas or hydrogen-rich gas is supplied from a hydrogen tank (not shown) to the hydrogen combustor 45, and the heat exchanger 43 heats up the antifreeze liquid using the combustion gas as a warming medium. Thereafter, the antifreeze liquid flows through the heat transfer tubes 36 (the heater in the water storage section) of the water storage tank 33, heats up the water (ice) in the water storage tank 33 and returns to the heat exchanger 43. In this case, the antifreeze liquid functions as a warming medium and heats up the fuel cell stack 1 by flowing therethrough. The antifreeze liquid is heated as long as the hydrogen gas or the hydrogen-rich gas is supplied to the hydrogen combustor 45. The fuel cell stack 1 and the water storage tank 33 are heated by this antifreeze liquid flowing through the fuel cell stack 1 and the heat transfer tubes 36 of the water storage tank 33. Therefore, even in the case where the water in the water storage tank 33 is frozen, the frozen water in the water storage tank 33 is melted by the heat transferred from the heated antifreeze liquid. The water melted by the antifreeze liquid is supplied to the fuel cell stack 1 through the humidification water supply path 31 connected with the water pump 34 and used for humidification of the fuel cell stack 1.

When the water in the water storage tank 33 is frozen, the water expands its volume and put stress onto the water storage tank 33. Accordingly, too much stress may lead to damage of the water storage tank 33. Thus, in the power generation system for an electric vehicle, to which the present invention is applied, the volume expansion absorber 39 is provided in the water storage tank 33. When the water in the water storage tank 33 is frozen, a volume of the volume expansion absorber 39 is reduced to absorb the volume expansion of the frozen water. Thus, the stress caused by the volume expansion of the freezing water is reduced, preventing the damage of the water storage tank 33 such as deformation and cracks. A configuration of the water storage tank 33 will be described below in detail.

Figure 2:
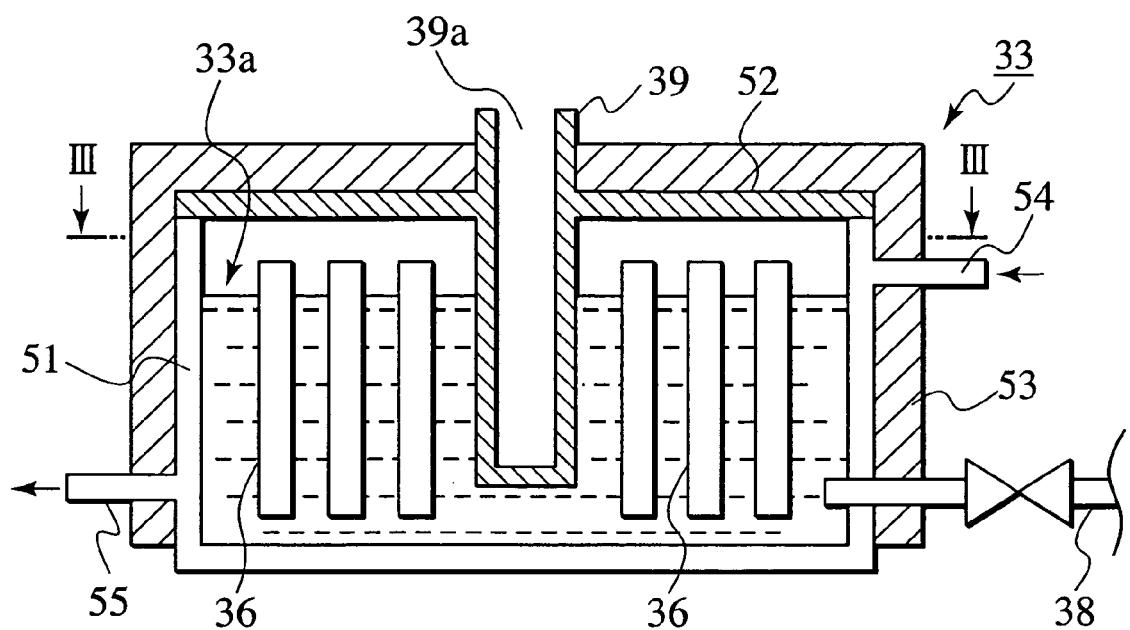
FIG. 2 is a cross-sectional view of the water storage tank shown in FIG. 1.
Figure 3:
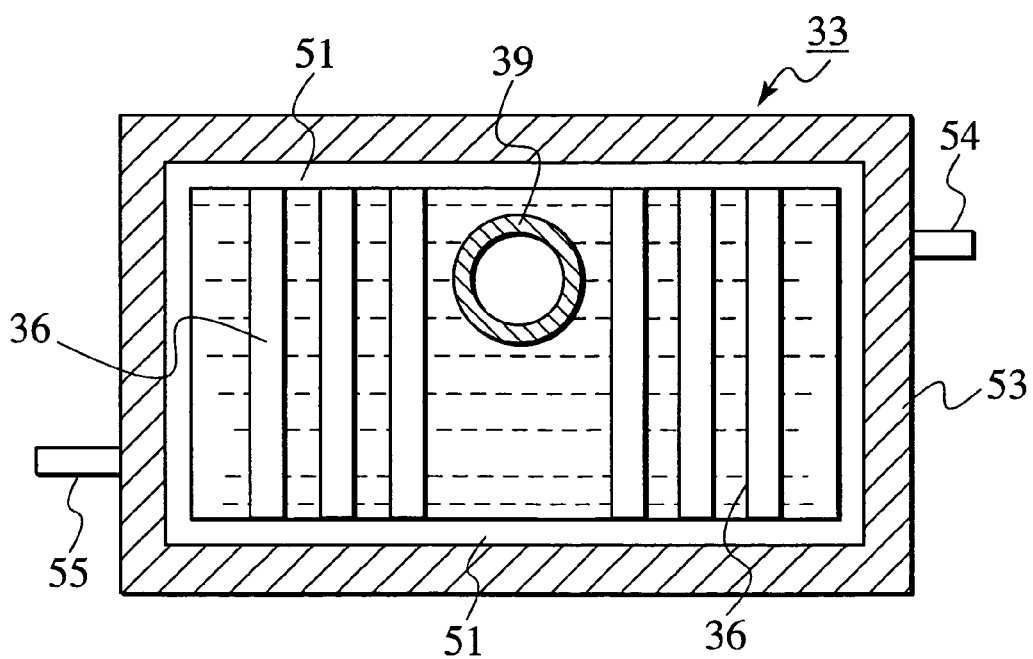
FIG. 3 is a cross-sectional view of the water storage tank shown in FIG. 1 taken along the line III-III in FIG. 2.

In the water storage tank 33, as shown in FIGS. 2 and 3, the heat transfer tubes 36 which function as the heater is provided in the water storage section 33*a*. The heat transfer tubes 36 have heat emitting surfaces through which heat is transferred from the antifreeze liquid flowing through the heat transfer tubes 36 as a warming medium to the water (ice) in the water storage section 33*a*. The heat transfer tubes 36 are arranged in rows in the water storage section 33*a*. In this embodiment, three rows of the heat transfer tubes 36 are arranged on each side of the volume expansion absorber 39. Moreover, the respective heat transfer tubes 36 are connected to a peripheral container 51 provided around the water storage tank 33 and integrated therewith. Thus, the antifreeze liquid from the circulating path 41 flows into the respective heat transfer tubes 36 through the peripheral container 51.

Similarly to the heat transfer tubes 36, the peripheral container 51 has a heat emitting surface. When the antifreeze liquid as the warming medium flows through the peripheral container 51, the water (ice) in the water storage section 33*a* is heated. The peripheral container 51 has a function as the heater which heats the inside of the water storage section 33*a* together with the heat transfer tubes 36, and as an outer wall of the water storage section 33*a*. In the water storage tank 33, a lid 52 is put on a top face of the peripheral container 51 and a heat insulator 53 is provided around the peripheral container 51.

In an upper end portion of the peripheral container 51, a warming medium inlet tube 54 is connected, through which the antifreeze liquid as the warming medium is introduced from the circulating path 41 of the cooling system 4 to the peripheral container 51 and the heat transfer tubes 36. Similarly, in a bottom portion of the peripheral container 51 on an opposite side, a warming medium outlet tube 55 is connected, through which the antifreeze liquid, after flowing through the peripheral container 51 and the heat transfer tubes 36, returns to the circulating path 41.

The volume expansion absorber 39 is formed in a hollow cylinder with one end closed, for example, and is fixed to the water storage tank 33 so that an opening 39*a* at the other end thereof may be located outside of the water storage section 33*a* (outside of the lid 52). This volume expansion absorber 39 is formed of a material which is more deformable than a material forming the peripheral container 51 that is the outer wall of the water storage section 33*a*. The volume expansion absorber 39 may be formed in a shape more deformable than the peripheral container 51. Having regard to the fact that the coefficient of volume expansion of freezing water is about 9%, the volume expansion absorber 39 is set to have a deformable portion of about 9% or more of the volume of water stored in the water storage tank 33.

Moreover, it is preferable that the volume expansion absorber 39 is formed of a material having a low eluting property into pure water. Specifically, it is preferable that the volume expansion absorber 39 is formed of, for example, ethylene propylene rubber (EPDM) or high density polyethylene on the outside and polyamide on the inside (for example, nylon, the trade name). By use of the materials described above, the volume expansion absorber 39 is deformed more easily than the peripheral container 51 of the water storage tank 33 when the water is frozen, and the low eluting property into pure water thereof is maintained good.

Description will now be given to the function of the volume expansion absorber 39. In a condition below the freezing point in a cold region, the water in the water storage section 33*a* of the water storage tank 33 radiates its heat to the outside air and is frozen to expand the volume thereof. However, the volume expansion absorber 39 with the opening 39*a* outside the water storage section 33*a* is deformed so as to reduce the volume thereof, thus absorbing the volume expansion of the freezing water. Moreover, in a warm condition, the water therein is not frozen, and there is no force acting on the water storage section 33*a* other than a small water pressure. Thus, the volume expansion absorber 39 easily returns to its original shape. The volume expansion absorber 39 can be similarly deformed again to absorb the volume expansion of the freezing water, when the water storage tank 33 is set in a freezing condition in the cold region.

In order to prevent the water storage tank 33 from being damaged by the volume expansion attributable to freezing of water, the heat emitting surfaces of the peripheral container 51 and the heat transfer tubes 36 may be arranged in the water storage tank 33 to be slanted in an inverted trapezoidal shape, in a manner that the higher a region thereof surrounded by the heat emitting surfaces is located, the wider the region becomes.

However, in the structure described above, in order to maintain the inverted trapezoidal shape and make the above-described function effective even when a vehicle is parked at a slant, the heat emitting surfaces of the peripheral container 51 and the heat transfer tubes 36 have to be slanted at an angle larger than a vehicle tilt angle, and a lower part of each heat transfer tube 36 needs to be made wider. The volume of the heat transfer tube 36 is thus increased, and the water storage tank grows in size with its capacity reduced. The peripheral container 51 with heat emitting surfaces slanted at a large angle raises layout restrictions. Further-more, if the water is frozen in a state where a water surface is in contact with the lid 52, the lid 52 may be deformed by the volume expansion of the freezing water, and parts/equipment provided on the lid 52 may be damaged.

On the contrary, in the water storage tank 33 of this embodiment, the heat emitting surfaces of the peripheral container 51 and the heat transfer tubes 36 can be straight and upright. The volume expansion due to freezing of the water is properly absorbed by the volume expansion absorber 39. The damage to the water storage tank 33 can be effectively prevented, without increasing the size of the tank and reducing the capacity thereof. The coolant of the fuel cell stack 1 is used as the warming medium for heating the inside of the water storage section 33a of the water storage tank 33. The heater for the fuel cell stack 1 can be used as the heater in the water storage section 33a, whereby the system can be simplified and cost-saving.

(Second Embodiment)

Figure 4:
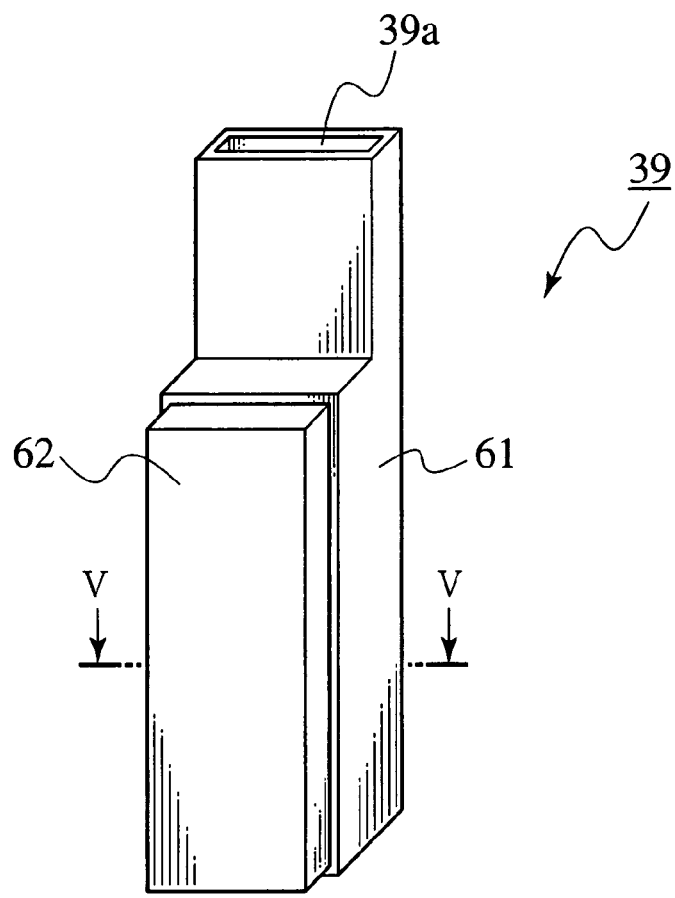
FIG. 4 is a perspective view showing another example of a volume expansion absorber of the water storage tank.
Figure 5:
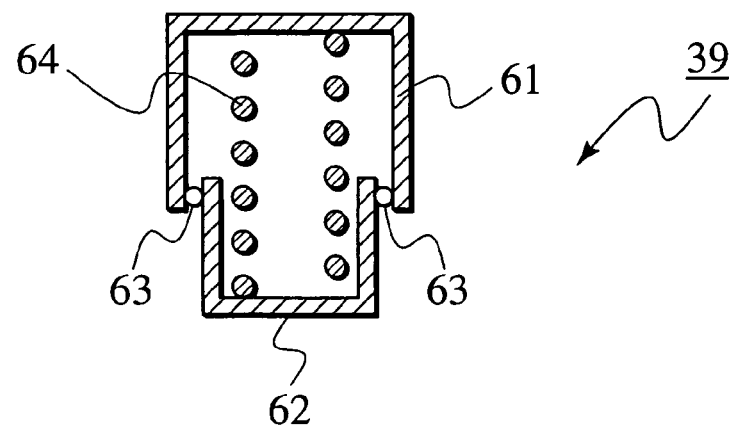
FIG. 5 is a cross-sectional view of the volume expansion absorber shown in FIG. 4 taken along the line V-V in FIG. 4.

FIGS. 4 and 5 show a modified example of the volume expansion absorber 39 in a second embodiment of the present invention. The fuel cell system and the other parts/equipment of the water storage tank 33 have similar constructions to those of the first embodiment described above, therefore the description thereof will be omitted.

The volume expansion absorber 39 of this embodiment has a structure in which two cases are combined. One of the cases is made movable by means of a spring element to absorb volume expansion caused by freezing of water.

Specifically, the volume expansion absorber 39 of this embodiment includes: a case-shaped fixed member 61 having an opening 39a on one side thereof; a movable member 62 which is combined with the fixed member 61 to form a sealed case and moves (strokes) when the volume expansion is caused by freezing of water; a seal member 63 which prevents water from penetrating into the fixed member 61 and the movable member 62 and enables the movable member 62 to slide; and a spring element 64 which returns the movable member 62 to its original state in a warm environment.

As materials of the fixed member 61 and the movable member 62, stainless steel having a low eluting property into pure water, surface-treated aluminum and the like are effectively used. By use of the materials described above as the materials of the fixed member 61 and the movable member 62, it is possible to avoid such an adverse effect as that the materials of the fixed member and the movable member 62 are dissolved in humidification water and the conductivity thereof is increased.

Note that, as long as the fixed member and the movable member are combined and movement of the movable member absorbs the volume expansion caused by freezing of water, the structure of the volume expansion absorber 39 is not limited to that shown in FIGS. 4 and 5. Thus, various modifications thereof are possible. The movable member may be movable in a direction perpendicular to a longitudinal direction of the volume expansion absorber 39, that is, in a horizontal direction in this embodiment. Alternatively, the movable member may be movable in a direction parallel to the longitudinal direction of the volume expansion absorber 39, that is, in a vertical direction in this embodiment.

Figure 6:
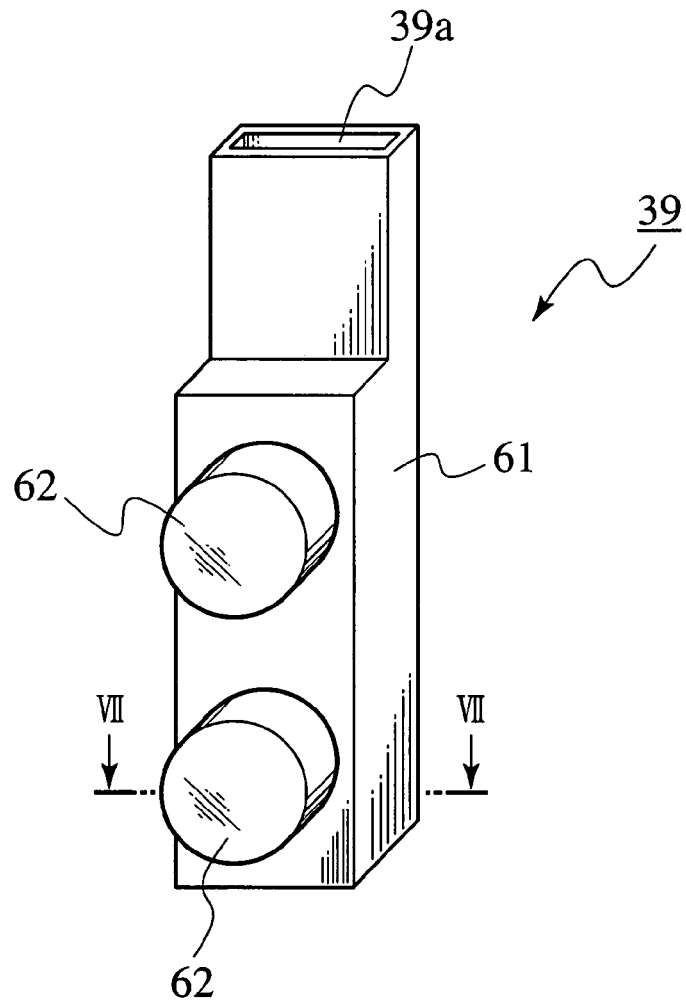
FIG. 6 is a perspective view showing one more example of the volume expansion absorber of the water storage tank.
Figure 7:
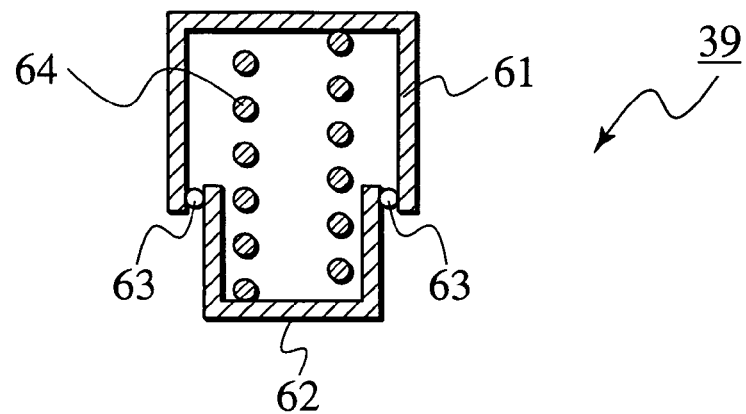
FIG. 7 is a cross-sectional view of the volume expansion absorber shown in FIG. 6 taken along the line VII-VII in FIG. 6.
Figure 8:
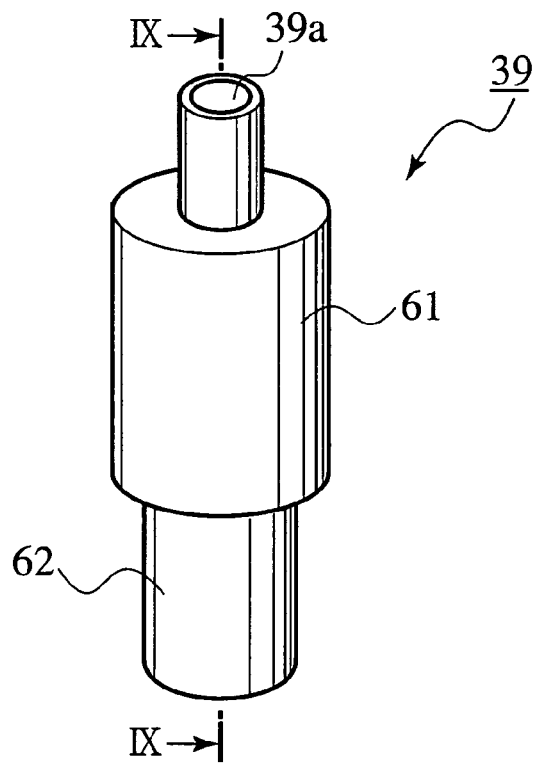
FIG. 8 is a perspective view showing one more example of the volume expansion absorber of the water storage tank.
Figure 9:
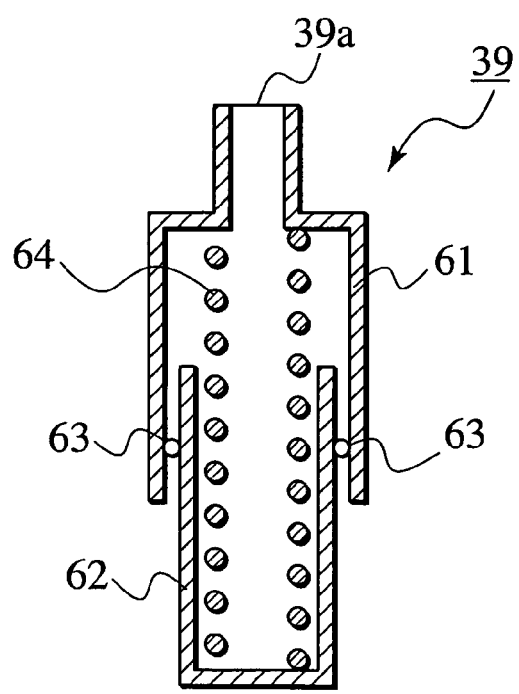
FIG. 9 is a cross-sectional view of the volume expansion absorber shown in FIG. 8 taken along the line IX-IX in FIG. 8.

For example, as shown in FIGS. 6 and 7, the volume expansion absorber 39 may have a plurality of cylindrical movable members 62, each of which is movable relative to the fixed member 61 and can be pushed thereinto by use of the spring element 64 as shown in FIG. 7. Moreover, as shown in FIGS. 8 and 9, the volume expansion absorber 39 may be formed in a double cylinder structure, in which both of the fixed member 61 and the movable member 62 are formed in cylindrical shapes and coupled with the spring element 64 therebetween so that the movable member 62 is retractable. In this volume expansion absorber 39, the movable member 62 is formed to have a cylindrical shape and the seal member 63 is formed to have a ring shape. This configuration provides an improved sealing between the fixed member 61 and the movable member 62 and an enhanced reliability of the volume expansion absorber.

Here, description will be given to functions of the volume expansion absorber 39 of this embodiment. If the water storage tank 33 is left in a condition below the freezing point in a cold region, the water in the water storage section 33a thereof is frozen and expands its volume. With a proper setting of elastic modulus of the spring element 64, the movable member 62 is pushed into the fixed member 61. The volume of the volume expansion absorber 39 is reduced, thus absorbing the volume expansion of the freezing water. Having regard to the fact that the coefficient of volume expansion of freezing water is about 9%, size and stroke of the movable member 62 is set to provide, when retracting, a space in the water storage section 33a of about 9% or more of the volume of the stored pure water.

Moreover, in a warm condition, the water therein is not frozen, and there is no force acting on the water storage section 33a other than a small water pressure. Thus, the spring element 64 returns the movable member 62 to its original position, restoring the volume of the volume expansion absorber 39 without causing fatigue or damage of parts/equipment of the water storage tank 33.

In the second embodiment, in addition to the effects of the first embodiment, fatigue of the parts of the volume expansion absorber 39 caused by the repeating loads of the freezing/melting water can be suppressed and durability of the parts of the volume expansion absorber 39 is improved.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matter contained in Japanese Patent Application No. 2003-156614, filed on Jun. 2, 2003, the disclosure of which is expressly incorporated herein by reference in its entirety.

What is claimed is:

1. A water storage device of a fuel cell system, comprising:

a water storage section adapted to store water to humidify a fuel cell; and a volume expansion absorber which contracts to absorb volume expansion of water due to freezing in the water storage section, wherein the volume expansion absorber includes a fixed member, a movable member movable relative to the fixed member by a spring element, and a seal member to seal between the fixed member and the movable member, and wherein the volume expansion absorber is formed of a material which is less resistant to deformation than material of an outer wall of the water storage section.

2. The water storage device of claim 1, wherein the volume expansion absorber is formed in a hollow cylinder with one end closed.

3. The water storage device of claim 2, wherein the volume expansion absorber has an opening on the other end thereof.

4. The water storage device of claim 3, wherein the volume expansion absorber is provided such that at least a part thereof is submerged in water in the water storage section and the opening is positioned outside of the water storage section.

5. The water storage device of claim 2, wherein the volume expansion absorber is formed of ethylene propylene rubber.

6. The water storage device of claim 2, wherein the volume expansion absorber is formed of high density polyethylene and polyamide, the high density polyethylene being on a surface of the volume expansion absorber to be in contact with water in the water storage section.

7. The water storage device of claim 1, wherein the movable member is formed to have a cylindrical shape and the seal member is formed to have a ring shape.

8. A fuel cell system comprising the water storage device of claim 1.

9. The fuel cell system of claim 8, further comprising: a heater which heats an inside of the water storage section of the water storage device.

10. The fuel cell system of claim 9, wherein the heater heats the inside of the water storage section by circulating a warming medium therein.

11. The fuel cell system of claim 9, further comprising: a cooling system for cooling the fuel cell, wherein a coolant of the cooling system is heated and used as a warming medium.

12. The fuel cell system of claim 11, wherein the coolant comprises an antifreeze liquid.

* * * * *